United States Patent

Kagatani

[11] Patent Number: 5,900,330
[45] Date of Patent: May 4, 1999

[54] POWER DEVICE

[76] Inventor: Takeo Kagatani, 308 Mano-Nogizaka 8-12-30 Akasaka Minato-Ku, Tokyo, Japan, 107

[21] Appl. No.: 08/935,092

[22] Filed: Sep. 25, 1997

[51] Int. Cl.[6] ..................................................... H01M 8/18
[52] U.S. Cl. .................................. 429/17; 429/21; 429/24
[58] Field of Search .................................. 429/17, 20, 21, 429/24

[56] References Cited

U.S. PATENT DOCUMENTS

| | | | |
|---|---|---|---|
| 5,187,024 | 2/1993 | Matsumura | 429/24 |
| 5,250,368 | 10/1993 | Golben et al. | 429/21 X |
| 5,506,066 | 4/1996 | Sprouse | 429/21 |
| 5,612,148 | 3/1997 | Zito | 429/17 X |

*Primary Examiner*—Stephen Kalafut
*Attorney, Agent, or Firm*—Ward & Olivo

[57] ABSTRACT

The present invention relates generally to a new power device. More specifically, it creates hydrogen from supplied water and electricity. The hydrogen is then used in combination with air in an electrolysis-electrical cell to produce electric power. All of this is accomplished by first storing the hydrogen in a storage tank or section furnished for such storage, then converting the electricity, via a power converter, to power. Additionally, the power device of the present invention has a special feature whereby the electric power is created from the hydrogen stored in the above mentioned metal alloy hydride storage tanks. The present invention primarily comprises the following four components: (1) an energy source (i.e., a photovoltaic array to convert solar energy to electrical power; a windmill to collect wind power and convert it to electrical power; etc.); (2) a compressor which supplies the electrolysis-fuel cell with oxygen and the hydrogen storage tank with hydrogen from the atmosphere; (3) a hydrogen storage device (i.e., a solid metallic alloy hydride which stores hydrogen through a reversible chemical process); and (4) a hydrogen consumption device (i.e., an electrolysis-fuel cell which consumes the hydrogen released from the tanks (using a heat exchange process) to provide electricity which powers a motor).

19 Claims, 3 Drawing Sheets

POWER DEVICE

TECHNICAL FIELD OF THE INVENTION

The present invention relates generally to fuel cells and to a power device for use in hydrogen powered cars. More specifically, the present invention discloses a novel power device which does not create any environmentally polluting exhaust, and is extremely efficient, long lasting, quiet and inexpensive.

BACKGROUND OF THE INVENTION

A fuel cell device generates electricity directly from a fuel source, such as hydrogen gas, and an oxidant, such as oxygen or air. It does so by continuously changing the chemical energy of a fuel and oxidant to electrical energy. Since the process does not "burn" the fuel to produce heat, the thermodynamic limits on efficiency are much higher than normal power generation processes. In essence, the fuel cell consists of two catalytic electrodes separated by an ion-conducting membrane. The fuel gas (e.g. hydrogen) is ionized on one electrode, and the hydrogen ions diffuse across the membrane to recombine with the oxygen ions on the surface of the other electrode. If current is not allowed to run from one electrode to the other, a potential gradient is built up to stop the diffusion of the hydrogen ions. Allowing some current to flow from one electrode to the other through an external load produces power.

The membrane separating the electrodes must allow the diffusion of ions from one electrode to the other, but must keep the fuel and oxidant gases apart. It must also prevent the flow of electrons. Diffusion or leakage of the fuel or oxidant gases across the membrane leads to explosions and other undesirable consequences. If electrons can travel through the membrane, the device is fully or partially shorted out, and the useful power produced is eliminated or reduced. Ehrenberg et al. U.S. Pat. No. 5,468,574 discloses such a membrane which allows the diffusion of ions, but prevents both the flow of electrons and the diffusion of molecular gases. This membrane is also mechanically stable.

In constructing a fuel cell, it is particularly advantageous that the catalytic electrodes be in intimate contact with the membrane material. This reduces the "contact resistance" that arises when the ions move from the catalytic electrode to the membrane and vice versa. Intimate contact can be facilitated by incorporating the membrane material into the catalytic electrodes. [See Wilson and Gottsfeld J. Appl. Electrochem. 22, 1–7 (1992)]

For reasons of chemical stability, fuel cells presently available typically use a fully fluorinated polymer such as Dupont Nafion Registered TM as the ion-conducting membrane. This polymer is very expensive to produce, which raises the cost of fuel cells to a level that renders them commercially unattractive.

Ion-conducting polymers are well known. (See Vincent, C. A., Polymer Electrolyte Reviews I, 1987). The known polymers are, for the most part, similar to sulfonated polystyrene because of the known ability of sulfonated polystyrene to conduct ions. Unfortunately, uncrosslinked, highly sulfonated polystyrenes are unstable in the aqueous environment of a fuel cell, and do not hold their dimensional shape.

U.S. Pat. No. 4,849,311 discloses that a porous polymer matrix may be impregnated with an ion-conducting polymer to produce a fuel cell membrane. However, the ion-conducting polymer must be dissolved in a solvent which "wets" the porous polymer. When the solvent evaporates, there is sufficient porosity remaining in the porous polymer/ion-conducting polymer composite material that molecular oxygen can leak through to the fuel gas and result in an explosion.

U.S. Pat. No. 3,577,357 (Winkler) discloses a water purification membrane composed of block copolymers of sulfonated polyvinyl arene block and alpha-olefin elastomeric blocks. In one example a styrene-iosprene-styrene triblock copolymer was selectively hydrogenated, then sulfonated using a premixed SO3/triethylphosphate reagent at 60° C. for 1.5 hrs. A sulfonated styrene-(ethylene-propylene) copolymer was the result. The method provided solid agglomerates of the polymer which were rolled on a mill to remove water, swelled in cyclohexane, slurried in an isopropyl alcohol/water mixture, and coagulated in hot water. No membrane was produced, and we have found that polymers produced according to the method of Winkler cannot be cast into films.

Gray et al. [Macromolecules 21, 392–397 (1988)] discloses a styrene-butadiene-styrene block copolymer where the ion-conducting entity is a pendant short-chain of poly (ethylene oxide) monomethyl ether (mPEG) complexed with $LiCF_3SO_3$ salt and connected through a succinate linkage to a flexible connecting entity which is the butadiene block of the triblock copolymer. The ion-conducting entity in the butadiene block is in the continuous phase of the polymer, and the areas populated by the ion-conducting entities do not preferentially touch each other to form continuous ion-conducting domains. This morphology does not facilitate the ion-conducting properties that are necessary for fuel cell operation. The styrene block functions only as a mechanical support structure for the polymer. Moreover, the molecular design chosen by Gray et al. is incompatible with the working environment of a fuel cell. Because the succinate linkage which joins the mPEG to the butadiene backbone and the ether linkages which join the ethylene oxide units are subject to cleavage by acid hydrolysis, these linkages are unstable in the low pH environment of a fuel cell even for short periods of time.

In the art of battery separators, as exemplified by U.S. Pat. No. 5,091,275, a number of porous polymers and filled polymer materials are well known. The pores of these polymers and composite materials are filled with, typically, a liquid electrolyte to conduct ions from one electrode to another in a battery. However, these battery separator materials allow the passage of gases, so that fuel cells made with them have an unfortunate tendency to explode as the oxygen leaks into the hydrogen side of a fuel cell.

To be useful, the hydrogen gas produced must be stored for later use to provide energy when needed. The production of hydrogen from water generally consists of transmitting electrical energy to electrodes within an electrolyzer to induce an electric potential difference which disassociates water into hydrogen and oxygen. The electrolyzer generally contains pure water having as electrolyte of sodium hydroxide or potassium hydroxide. These electrolytes are not destroyed nor do they need to be replenished during the operation of the electrolyzer. Thus, even though the electrolysis action (the producing of chemical changes by the passage of an electric current through an electrolyte (a nonmetallic electric conductor in which current is carried by the movement of ions, or a substance that when dissolved in a suitable solvent or when fused becomes an ionic conductor)) may take place intermittently, the hydrogen produced can be maintained in storage and turned back into electrical energy (either by combustion or by use of a fuel cell) when desired.

One of the more efficient electrolyzers presently available is a solid polymer electrolyte ("SPE") unit. These units basically consist of two electrodes, an anode and a cathode, placed in a perfluorinated sulfonic acid polymer. The electrodes are connected through an external circuit to a power supply. Water is broken down at the anode into oxygen, hydrogen ions and electrons. The electrons flow through the external circuit to the cathode while the hydrogen ions flow through the electrolytic polymer to the cathode where they combine with the electrons and form hydrogen. The equations at the anode and cathode are:

$$H_2O \rightarrow 2H^+ + \frac{1}{2}O_2 + 2e^-$$

and the overall reaction is:

$$H_2O \rightarrow H_2 + \frac{1}{2}O_2$$

The by-product of this process is an effluent containing trace hydrofluoric acid, oxygen gas and excess water.

SPE electrolyzers are one of the two main types of electrolyzers available. SPE electrolyzers are also known as PEM, or Proton Exchange Membrane, for the way in which they split water. The other type, liquid electrolyte ("LE") electrolyzers, uses as its electrolyte a strong acidic or basic solution, typically potassium hydroxide. However, there are a number of advantages that an SPE electrolyzer has over LE electrolyzers. The concentration of the solution in an LE electrolyzer must be maintained at a constant level for the electrolytic reaction to take place, while SPE electrolyzers maintain constant concentration over their life. SPE electrolyzers are also safer, since they do not require a supply of a strong highly corrosive basic solution as do LE electrolyzers.

The hydrogen gas thus produced is a storable, transportable, clean, and non-polluting fuel. However, hydrogen has the fundamental limitation of being difficult to store. Hydrogen has a boiling point of −252.87° C. and a density of 0.09 grams per liter. This means that in order to store hydrogen in reasonable sized tanks, it must be stored either under pressure, at low temperature, or both. Unfortunately, it takes energy to create high pressures and low temperatures. Thus, the overall efficiency and cost effectiveness of producing and storing hydrogen is reduced.

In order to overcome the hydrogen storage problem, it has been found that hydrogen can be stored in a solid form via "rechargeable" metal hydrides, such as iron-titanium-manganese (Fe44Ti55Mn5) alloy, mischmetal-nickel aluminum hydriding (Mn0.97Ni4.5Al0.5) alloy, and the like. This can best be described by the reversible chemical reaction of a solid metal hydride(Me) with gaseous hydrogen (H2) to form a solid metal hydride (MeH x):

$$\frac{2}{x}Me + H_2 \leftrightarrows MeH_x + heat$$

The forward or exothermic reaction is characteristic of the charging (absorption) of hydrogen to the hydride while the reverse or endothermic reaction is the discharging (desorption) of hydrogen from the metal hydride. Among the many advantages of hydrogen storage via a metal hydriding alloy, the most significant is the low charging and discharging pressures required to hydride which lessens the risk of leakage and explosion associated with storing hydrogen as a compressed gas.

When examining the thermodynamic aspects of the reversible metal-hydrogen reaction, it is advantageous to determine the absorption and desorption properties of metals from pressure-composition isotherms. The abscissa of such isotherms is typically in the form of a hydrogen atoms to metal atoms ratio ("H/M"). FIG. 1 shows the ideal absorption-desorption pressure-composition isotherm for a metal-hydrogen system where the plateau pressure ("$P_p$") 30 is shown connecting points B and C. Once the plateau pressure is reached, the majority of the absorption or desorption of hydrogen takes place at this constant pressure $P_p$.

The curves connecting points A and B as well as points C and D show that for a large increase or decrease in pressure, the amount of hydrogen absorbed or desorbed is small.

In reality, while such isotherms as shown in FIG. 1 might be achievable, most hydrides deviate from this ideal behavior. In addition to the fact that the plateau region slopes and the boundaries of this region are not as well defined, there also exists hysteresis between absorption and desorption curves. For ideal hydrides, there is no means by which to measure the composition of the hydride when located along the plateau pressure; but the slope in the isotherm for real metals makes finding the hydrogen to metal ratio as simple as knowing the temperature and pressure of the hydride.

The plateau pressure $P_p$ is related to the absolute temperature of the reaction, $T_R$, by the Van't Hoff equation:

$$\ln(P_p) \frac{\Delta H}{R_u T_R} \frac{\Delta S}{R_u}$$

where $\Delta H$ is the change in enthalpy, $\Delta S$ is the change in entropy and $R_u$ is the universal gas constant. From the Van't Hoff relationship one can determine the charging and discharging pressures and temperatures of the tank.

In recent years, numerous cars have been designed in order to realize a reduction of pollution and noise. Some of these cars have been fueled with nitrogen oxide and hydrogen, resulting in exhaust containing no carbon monoxide. Also, some of these cars have been getting driving force by loaded storage cells and motors.

However, there are several shortcomings of the cars previously made. First, these cars, which were fueled by hydrogen, have proven to display reduced driving force due to combusting hydrogen with an internal combustion engine. Second, regarding the exchange of fuel in the tank which stores the hydrogen and the refilling of this tank, there are currently serious problems concerning the potential for dangerous explosions. Third, these cars did not obtain sufficient driving distances per tank of fuel. Fourth, a car using a hydrogen fuel cell and a motor could not get enough cell capacity with the prior fuel cells such that it was necessary to combine many cells in order to get sufficient power. Finally, the prior fuel cells required a very long time to charge and their running distances were short.

It has also been previously suggested that in order to most efficiently use a fuel cell system for vehicular propulsion, the system should be, preferably, sized so as to provide sufficient power, at a useful voltage, for normal continuing operation, or cruising operation, when utilizing air as the oxidant, and that during peak loads, pure oxygen should be substituted for air as the oxidant. This allows the fuel cell system to be sized for normal low power/air operation, but also to provide a peak power capacity, at a suitable voltage, significantly greater than for normal operation, and without any complex changes to the system. Such a system is disclosed in U.S. Pat. No. 4,657,829. In this prior patent, the water generated by operation of the fuel cell is electrolyzed during normal operation by the excess electrical capacity of the fuel cell. The electrolysis results in the generation of hydrogen and oxygen gases, which in turn are stored under pressure for use when required at peak power capacity. Although this system does result in the desired peak power availability, the amount of oxygen which must be stored in order to have adequate peak power capacity is a problem for a vehicle for which minimum design weight is desired.

It is thus an object of the present invention to provide a fuel cell power system for a vehicle with improved peak power capability but with minimized high pressure gas storage requirement. It is yet a further object of the present invention to provide a fuel cell power system utilizing power created during operation of the vehicle and water generated by operation of the fuel cell to generate oxygen and hydrogen for use during peak power intervals, but wherein the effectiveness of the oxidant air is enhanced by enrichment with oxygen so as to reduce the amount of storage capacity required for peak acceleration requirements. It is yet another and further objective of the present invention to provide a fuel cell powered vehicle having improved efficacy during operation. Other objects and advantages will become apparent when considering the following specific description of an example of the invention.

The present invention provides a novel and useful power device which has overcome the problems existing in the prior hydrogen fuel cell systems used for electric cars, including but not limited to reducing exhaust pollution.

OBJECTS OF THE INVENTION

The present invention relates generally to a new power device. More specifically, it creates hydrogen from supplied water and electricity, which is stored in a storage tank furnished for such storage, so that the hydrogen can be used later. An electrolysis-electrical cell then produces electric power from the supplied hydrogen and air. The electricity created is then converted to power by a power converter. Additionally, this power device has a special feature whereby the electrical power is created by the hydrogen stored in the above mentioned storage section.

Another feature of the present invention is an electrolysis instrument fuel cell structured with three layers of platinum electrode, multiplex polymer membrane and iridium electrode.

Another feature of the present invention is that the storage section is made of a hydrogen storage alloy.

Another feature of the present invention is that the power converter contains a motor which acts as a storage cell charged with the power created at a fixed rate in the electrolysis-electrical cell and which supplies the necessary power at time of acceleration. Also, a controller which controls the charge and discharge of the above mentioned storage cell and controls the rotation speed of the motor and torque is incorporated in this invention.

Other objects, features, and characteristics of the present invention, as well as the methods of operation and functions of the related elements of the structure, will become more apparent upon consideration of the following detailed description with reference to the accompanying drawings, all of which form a part of this specification.

SUMMARY OF THE INVENTION

As discussed previously, this invention relates generally to a new power device. More specifically, it creates hydrogen from supplied water and electricity. This hydrogen is then used in combination with air in an electrolysis-electrical cell to produce electric power. This is accomplished by first storing the hydrogen in a storage tank or section furnished for such storage. Next, a power converter device converts the electricity, which is created in the above mentioned electrolysis-electrical cell, to power. Additionally, the power device of the present invention has a special feature whereby the electrical power is created from the hydrogen stored in the above mentioned storage tank. Further, this invention relates to a method and apparatus for converting energy to hydrogen gas and the storage of the hydrogen gas in, for example, metal alloy hydride storage tanks.

In an effort to overcome the numerous disadvantages associated with the production and storage of hydrogen gas generated from alternate energy sources, the present invention utilizes a novel apparatus for efficiently producing and storing hydrogen fuel which can be used as an environmentally-safe fuel for both heating and electric power generation, especially for automobiles.

The present invention primarily is comprised of four components. First, an energy source, such as a photovoltaic array to convert solar energy to electrical power, a windmill used to collect wind power and convert it to electrical power, and the like. Second, a compressor which supplies the electrolysis-fuel cell with oxygen from the atmosphere and hydrogen from the hydrogen storage tank. Third, a hydrogen storage device, such as a solid metallic alloy hydride which stores hydrogen through a reversible chemical process. Fourth, a hydrogen consumption device, such as an electrolysis-fuel cell which consumes the hydrogen released from the tanks (using a heat exchange process) to provide electricity which powers a motor.

An important feature of the present invention is matching the specifications of the electrolyzer to the hydriding and dehydriding reactions occurring with the metal hydride to allow the system to operate at sufficiently low pressures (near ambient) and thereby eliminate the need for holding the system under pressure.

The hydrogen produced is stored as a solid hydride when not in use, which eliminates the inconveniences and hazards associated with storing hydrogen as a compressed gas. Operating the solid hydride storage system and electrolyzer at low pressures lessens the chance of leakage and explosion, allows simpler sealing configurations, allows for the use of less expensive construction materials, lessens the chance of structural fatigue, allows for easy assembly of the entire system, and eliminates compressor pulsations and/or vibrations which can cause structural damage and leakage.

A significant advantage of the system is that hydrogen is produced in a steady supply using only air, water and either solar energy, wind power, or the like, which are practically inexhaustible.

An attractive aspect of the use of photovoltaic energy in the formation of hydrogen fuel is that hydrogen is environmentally benign. It can be burned in air without producing excessive amounts of greenhouse gases or other pollutants attributed to hydrocarbon or fossil fuels. Hydrogen can also be used to power a fuel cell to generate electricity directly, with the only by-product being water. The present invention can thus demonstrate the potential of hydrogen fuel as an alternate source of energy when produced in this safe and clean manner.

BRIEF DESCRIPTION OF THE DRAWINGS

A further understanding of the present invention can be obtained by reference to a preferred embodiment set forth in the illustrations of the accompanying drawing. Although the illustrated embodiment is merely exemplary of systems for carrying out the present invention, both the organization and method of operation of the invention, in general, together with further objectives and advantages thereof, may be more easily understood by reference to the drawings and the following description. The drawing is not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

The following presents a detailed description of a preferred embodiment of the present invention. As discussed above, this invention relates generally to a power device for use in hydrogen fuel cell cars. More specifically, the present invention discloses a novel power device which will not create any environmentally polluting exhaust (i.e., it does not emit any carbon dioxide), and is extremely efficient, long lasting, quiet and inexpensive to produce. Also, the device of the present invention does not require a large area and there is no concern about explosion. Additionally, this power device can replace the use of gas and electricity as the source of power in homes, factories, hotels, etc.

The method and device of the present invention creates hydrogen from supplied water and electricity, and an electrolysis-electrical cell section produces electric power from the supplied hydrogen and air. The hydrogen is then stored in a storage section furnished for such storage, while a power section converts the electricity created in the above mentioned electrolysis-electrical cell to power which propels the car.

The power device of the present invention has several special features which are vast improvements over the existing designs. First, the electrical power is created by the hydrogen stored in the above mentioned storage section. Second, the electrolysis instrument fuel cell is structured with three layers, a platinum electrode, a multiplex polymer membrane and an iridium electrode. Third, the storage section of the power device of the present invention is made of a hydrogen storage metal alloy. Fourth, the power section contains a motor which is a storage cell charged with the power created at a fixed rate in the electrolysis-electrical cell and supplies necessary power at the time of acceleration, and a controller that controls a charge and discharge of the above mentioned storage cell and controls the rotation speed of the motor and its torque.

With the above mentioned structures of storing hydrogen created from supplied water and electricity, the power device of the present invention can generate power from the electricity created by the stored hydrogen and the supplied air. For instance, with the above structure, a dangerous hydrogen fuel tank exchange or refill of hydrogen would not be necessary, and with a one time charge, a hydrogen fuel cell car that has enough driving distance can be offered.

Figure 2:
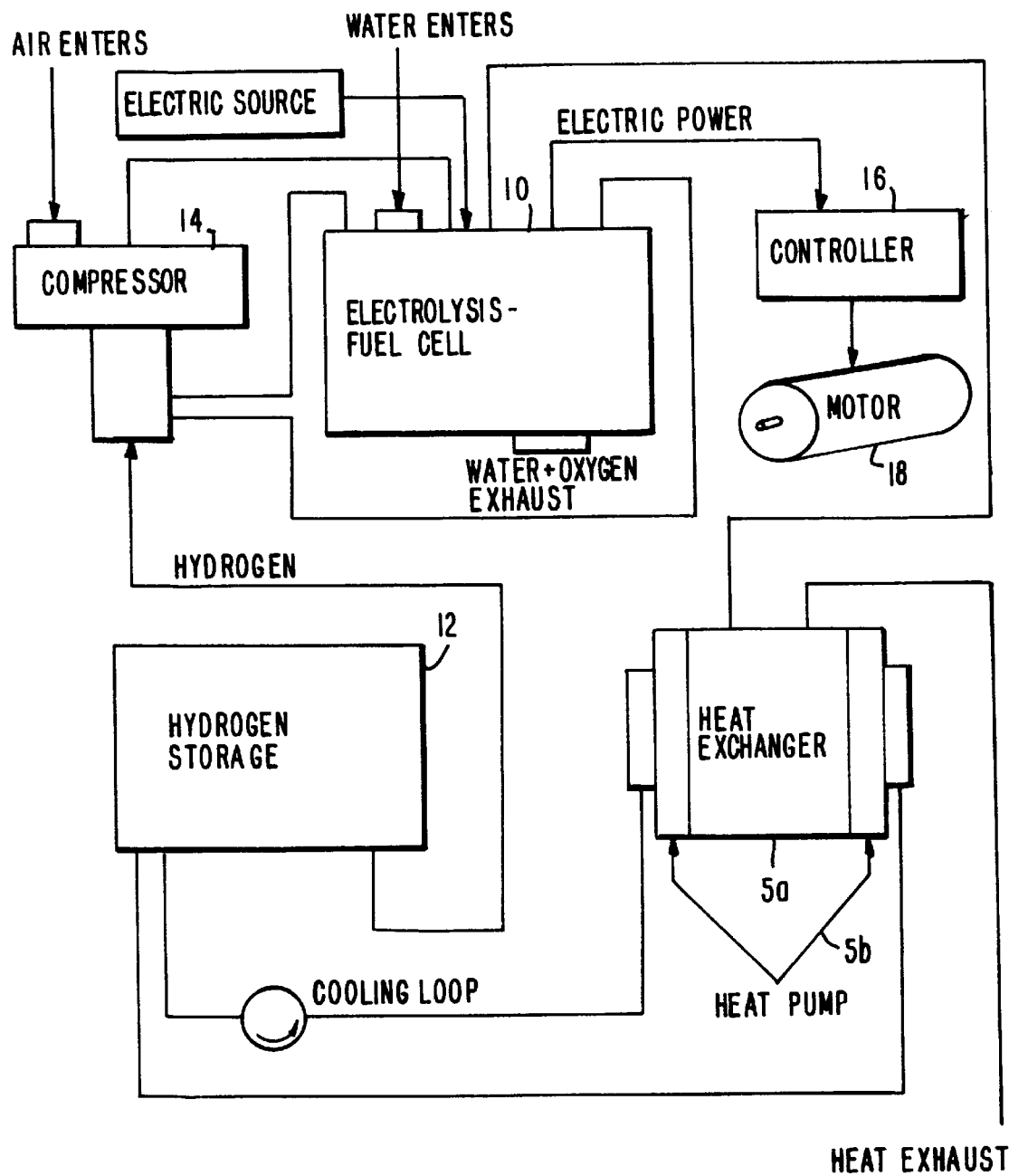
FIG. 2 shows a flow diagram of the process by which the power device of the present invention creates power, demonstrating the structural practice of the acceleration power of the hydrogen fuel cell automobile.

The following description of a preferred embodiment of the present invention explains the hydrogen fuel cell power device in detail while referencing the detailed drawings. Referring first to FIG. 2, shown is a block diagram of the structural practice of the motor lineage of the power device of the present invention. The present invention primarily comprises four components. First is an energy source, such as a photovoltaic array to convert solar energy to electrical power, a windmill used to collect wind power and convert it to electrical power, and the like. Second is compressor 14 which supplies the electrolysis-fuel cell 10 with oxygen from the atmosphere and hydrogen from the hydrogen storage tank 12. Third is a hydrogen storage tank 12, such as a solid metallic alloy hydride which stores hydrogen through a reversible chemical process. Fourth is a hydrogen consumption device, such as electrolysis-fuel cell 10 which consumes the hydrogen released from the hydrogen storage tank 12 (using heat exchanger 5a) to provide electricity which powers motor 18, which, for example, can propel a car. The process of the present invention is described in further detail below.

Initially, water enters the electrolysis fuel cell 10, and in conjunction with a supplied single electric charge, electrically disintegrates the supplied water to create hydrogen and oxygen.

The hydrogen, which is stored in the hydrogen storage tank 12, and the oxygen, taken from air in the atmosphere, are supplied to the electrolysis-fuel cell 10 by compressor 14, which work together to create the power of the device. In turn, this power propels motor 18 thereby generating moving power.

In sum, the power device of the present invention provides power to practical applications, such as electric cars, by efficiently creating electrical power from hydrogen fuel and a small, light electrolysis fuel cell. Additionally, the hydrogen storage tank 12 is structured with hydrogen storage alloys, such as titanium-iron alloy or lanthanum-nickel alloy, but is not limited to these alloys. However, the alloys are limited to those with a high hydrogen adsorption coefficient at low temperatures and to those which are not micro-pulverized by the hydrogen adsorption. This is important so that the storage of the hydrogen can last for an extended period of time, and so that the hydrogen storage tank 12 does not have to be replaced often.

Also, temperature control is crucial to the storing of hydrogen in the hydrogen storage tank 12, the removal of hydrogen from the hydrogen storage tank 12, the electrical solving at electrolysis-fuel cell 10 and the efficient creation of electric power. This temperature control of the hydrogen storage tank 12 and electrolysis-fuel cell 10 is accomplished with thermoelectrical heat pump 5b and heat exchanger 5a in a cooling loop. Furthermore, the storage rate can be raised by cooling the hydrogen storage alloy used when sending hydrogen to the hydrogen storage tank 12. Additionally, since the hydrogen storage alloy heats up when taking hydrogen out of the hydrogen storage tank 12, cooling is important at this stage to maintain efficiency.

Next, controller 16 controls the turning speed and torque of motor 18. Controller 16 contains a storage cell for accelerating time. This storage cell supplements a part of the electric power that motor 18 needs at the time of acceleration and charging at the time of fixed speed of the enforced practice. Also, the power device of the present invention exhausts oxygen resulting from the electrically resolved water at the time the hydrogen is supplied. A small amount of water results from the oxidation reaction at the time of the creation of the electric power. Heat is also generated from motor 18. However, this exhaust and heat emission is very small compared to a conventional car with an internal combustion engine.

The electrolysis fuel cell 10 of FIG. 2 uses a solid polymer electrolytic cell. Since a general polymer electrolytic cell has a low power to weight ratio and is not practical for this use, the present invention uses a polymer electrolytic cell with an elevated cell density, which is created by a laser. Here, the power to weight ratio of the solid polymer electrolytic cell is higher than a gasoline engine and its peak electrical current reaches 1,000 Amperes. If a large hydrogen storage tank 12 is used, with a one time charge, it is possible to run more than 1,000 kilometers on a single charge.

Figure 3:
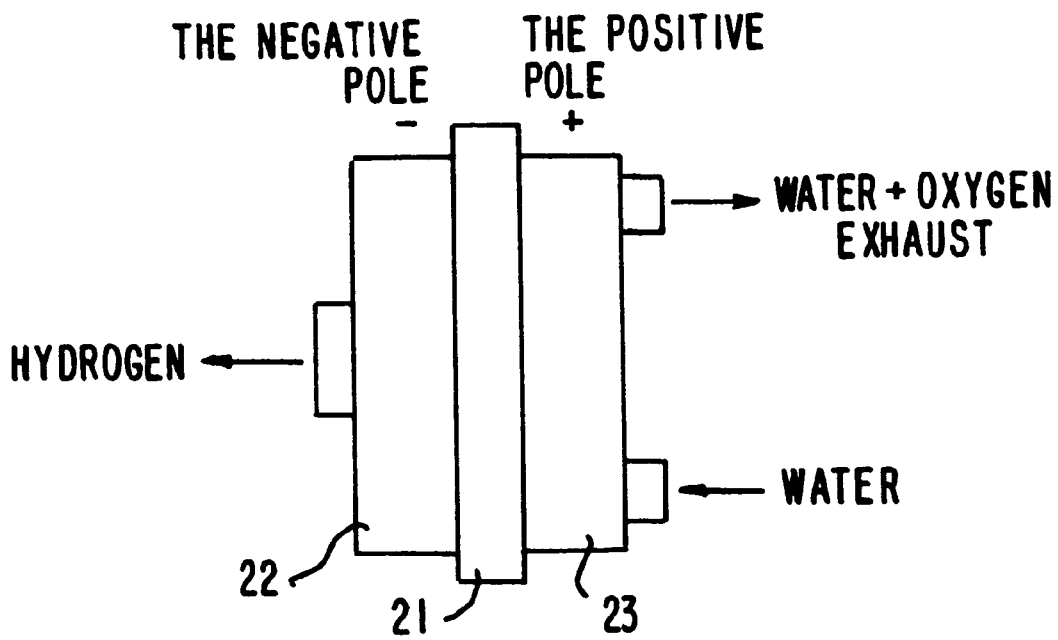
FIG. 3 shows the electrolysis-fuel cell of the present invention functioning as electrolysis, i.e., the producing of chemical changes by the passage of an electric current through an electrolyte, a nonmetallic electric conductor in which current is carried by the movement of ions, or a substance that when dissolved in a suitable solvent or when fused becomes an ionic conductor.

Referring next to FIG. 3, shown is the electrolysis-fuel cell of the present invention functioning as an electrolysis process. The drawing shows a multiplex polymer membrane 21, the negative pole 22 made of platinum to prevent oxidation, and the positive pole 23 made of an iridium membrane to reduce loss of oxygen by over voltage, which execute the function of the electrolytic fluid.

In this process, water is supplied to the positive pole 23 and electricity is supplied to the region between the positive pole 23 and negative pole 22. The electricity causes hydrogen ions from the supplied water to move toward the negative pole 22. This results in the creation of hydrogen at the negative pole 22 and oxygen at the positive pole 23. Furthermore, any form of electricity, such as that used for household purposes, will produce the desired results as previously mentioned. However, "midnight" electricity reduces the cost of creating the hydrogen fuel in the process of the present invention. Also, regarding the supplied water, any water source will suffice for the present invention to work, however water in which harmful ions have been removed by an ion removing cartridge produces the best results.

Furthermore, the created hydrogen must be cooled before being stored for later use. This is accomplished at the heat exchanger 5a, whereby the hydrogen is sent to the hydrogen storage tank 12 via compressor 14 after going through a water remover (not shown) and an oxygen remover (not shown).

Figure 4:
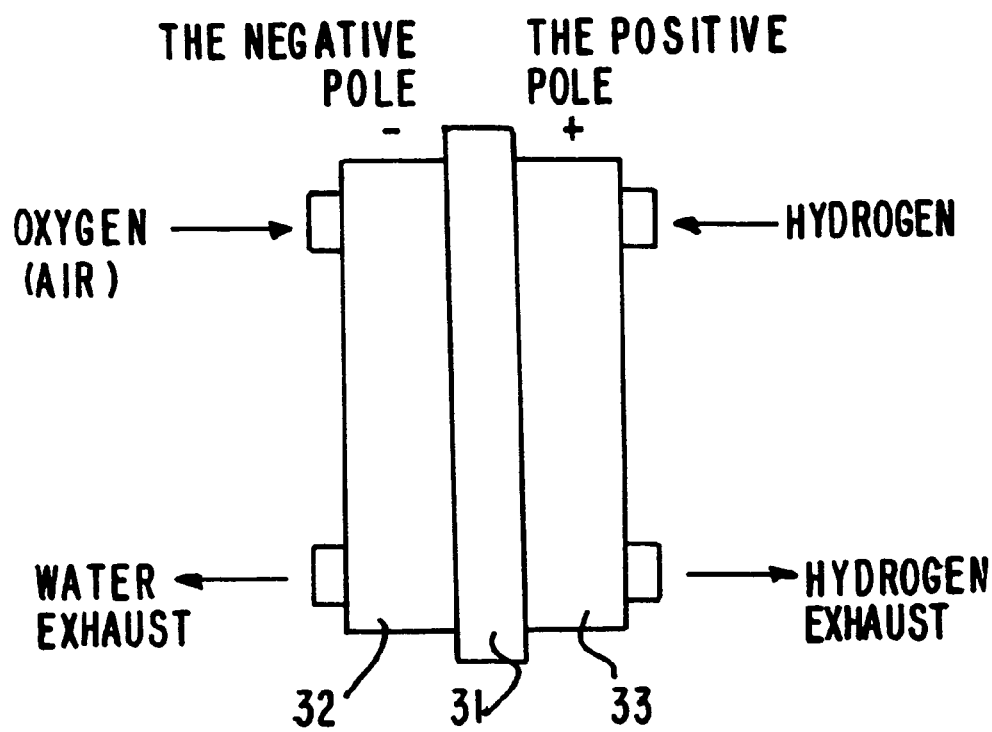
FIG. 4 shows the electrolysis-fuel cell of the present invention functioning as a fuel cell which produces the power to propel the automobile.

Finally, referring to FIG. 4, shown is the electrolysis-fuel cell of the present invention functioning as a fuel cell. This figure demonstrates that when oxygen is supplied to the negative pole 32 and hydrogen is supplied to the positive pole 33, oxidation occurs and electric power is generated by the electrode. The reaction is as follows:

Positive $$H_2 \rightarrow 2H^+ + 2e^-$$

Negative $$2H^+ + 2e^- + \frac{1}{2}O_2 \rightarrow H_2O$$

Overall Cell Reaction $$H_2 + \frac{1}{2}O_2 \rightarrow H_2O$$

According to the above described system of the present invention, the creation of electricity is conducted through the formation of water, with electrons being created in the positive pole 33. Furthermore, the voltage occurrence changes according to the current density of the electricity created, but ranges from about 0.75 V to about 1.0 V per cell. With the present invention, connecting several hundred cells in series creates the necessary voltage for optimal efficiency in the operation of the fuel cell.

Figure 1:
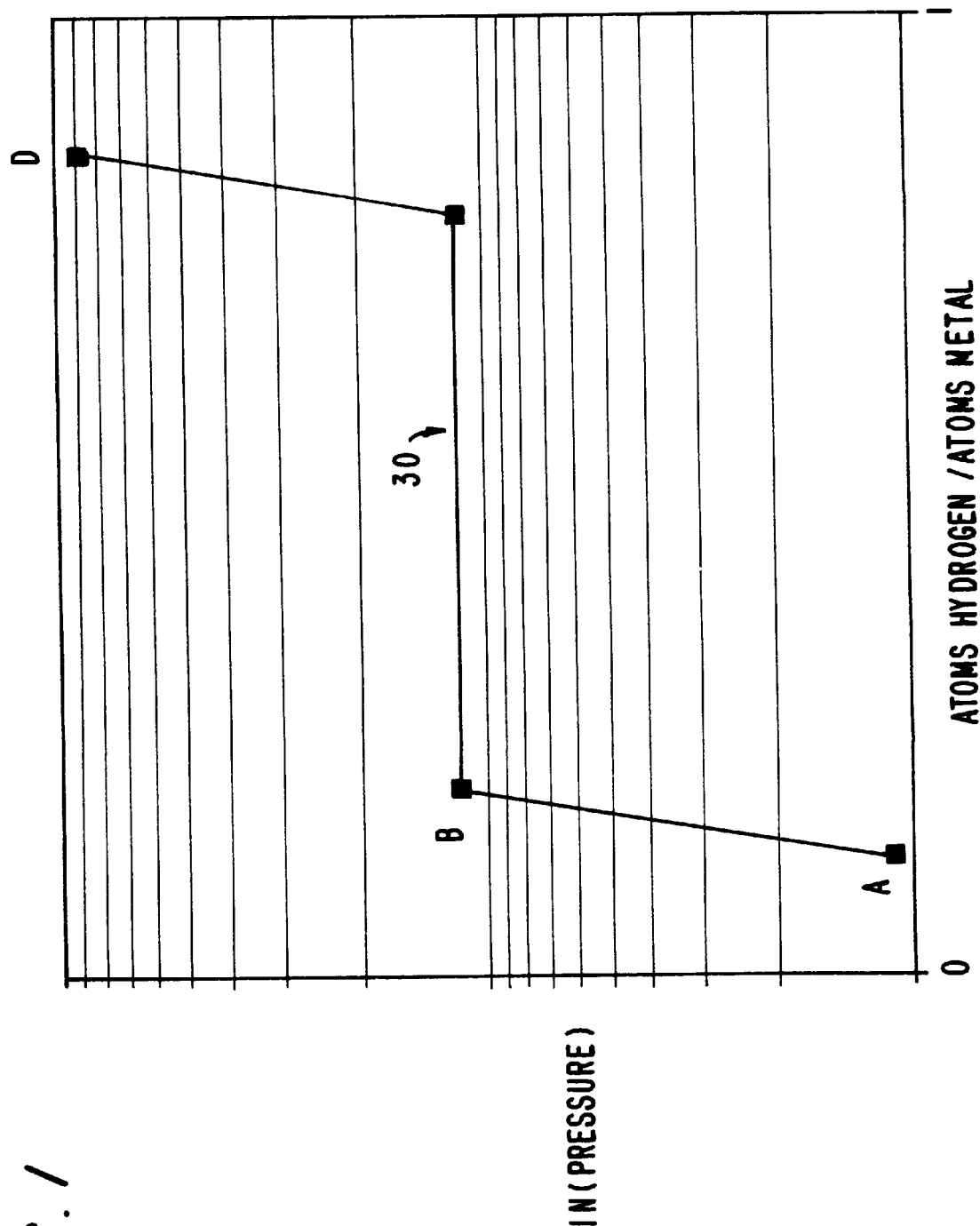
FIG. 1 is a plot showing the ideal absorption-desorption pressure-composition isotherm for a metal-hydrogen system.

Additionally, referring back to FIG. 1, when creating electric power with the electrolysis fuel cell 10, it is important to maintain energy efficiency by exhausting the heat that was created in the electrolysis fuel cell 10. This exhaustion occurs through the heat exchanger 5a. As explained in detail above, according to the present invention, because hydrogen is created from the supplied water and electricity in electrolysis fuel cell 10, the dangerous hydrogen fuel tank exchange or refill processes become obsolete.

Also according to the present invention, by using a small, light weight, high power to weight ratio electrolysis fuel cell 10 for the source of moving power, a highly efficient electric charge and discharge can be obtained. Therefore, with one charge, sufficient driving distance, in the range of 1000 kilometers can be obtained. Furthermore, applications of this electrolytic fuel cell are not limited to cars but also can be applied to boats, trains and airplanes, or for cooling, heating and home electrical power uses.

Also according to the present invention, the storage of hydrogen created from the supplied water and electricity, and the creation of electric power from this stored hydrogen and supplied air, this power device generates electric power which can power a variety of different machines such as automobiles, boats, etc., as well as entire homes, stores, schools, hotels, factories, etc. Therefore, with this invention, the dangerous exchange of hydrogen fuel tanks and hydrogen refills become unnecessary, and a hydrogen fuel cell car, boat, etc., which has a large traveling distance with a one time electrical charge can be offered.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. A power device for creating power from water and electricity, said power device comprising:
    an energy source;
    a hydrogen storage device;
    an electrolysis-fuel cell; and
    a compressor;
    wherein said electrolysis-fuel cell receives oxygen from said compressor, hydrogen from said hydrogen storage device, water from an external source and an electric charge from said energy source; wherein said electrolysis-fuel cell electrically disintegrates said water into hydrogen and oxygen; wherein said hydrogen is stored in said hydrogen storage device and said oxygen is purged from said electrolysis-fuel cell as exhaust; and wherein said electrolysis-fuel cell combines said hydrogen with air in said electrolysis-fuel cell to produce electric power.

2. A power device according to claim 1, wherein said power device further comprises a heat exchanger, wherein said heat exchanger controls the temperature of said hydrogen storage device and said hydrogen consumption device.

3. A power device according to claim 2, wherein said power device further comprises a controller, wherein said controller controls the power sent to the motor of the machine to be powered.

4. A power device according to claim 1, wherein said hydrogen storage device is a metal alloy hydride storage tank.

5. A power device according to claim 1, wherein said energy source is a photovoltaic array which converts solar energy to electrical power.

6. A power device according to claim 1 wherein said electrolysis-fuel cell comprises a solid polymer electrolyte cell.

7. A method for generating power using an electrolysis-fuel cell in which hydrogen is created from water and an electric charge, said method comprising the following steps:
    supplying water and an electric charge to said electrolysis-fuel cell;
    electrically disintegrating said water into hydrogen and oxygen;
    storing said hydrogen in a hydrogen storage device; and
    combining said hydrogen with air to generate said power;
    wherein a compressor supplies said electrolysis-fuel cell with said oxygen;
    wherein said compressor transfers said hydrogen from said hydrogen storage device to said electrolysis-fuel cell;

wherein a water source supplies said electrolysis-fuel cell with said water; and wherein an energy source supplies said electrolysis-fuel cell with said electric charge.

8. A method for generating power according to claim 7, wherein said method further comprises the step of:

controlling the temperature of said hydrogen storage device and said electrolysis-fuel cell.

9. A method for generating power according to claim 8, wherein said controlling is performed by a heat exchanger.

10. A method for generating power according to claim 7, wherein said method further comprises the step of:

controlling the power sent to the motor of the machine being powered.

11. A method for generating power according to claim 10, wherein said controlling is performed by a controller.

12. A method for generating power according to claim 7, wherein said hydrogen storage device is a metal alloy hydride storage tank.

13. A method for generating power according to claim 7, wherein said energy source is a photovoltaic array which converts solar energy to electrical power.

14. A power device comprising:

an energy source;

a water source;

an electrolysis-fuel cell;

a hydrogen storage device; and a compressor, wherein an electric charge from said energy source and water from said water source are provided to said electrolysis-fuel cell; wherein said electrolysis-fuel cell electrically disintegrates said water into hydrogen and oxygen, thereby providing hydrogen to said hydrogen storage device; and wherein hydrogen from said hydrogen storage device and oxygen from the atmosphere are provided to said electrolysis-fuel cell through said compressor, thereby creating electric power, water which is extracted as exhaust and hydrogen which is provided to said hydrogen storage device.

15. A power device according to claim 14, wherein said power device further comprises a heat exchanger, wherein said heat exchanger controls the temperature of said hydrogen storage device and said electrolysis-fuel cell.

16. A power device according to claim 15, wherein said power device further comprises a controller, wherein said controller controls the power sent to the motor of the machine to be powered.

17. A power device according to claim 14, wherein said hydrogen storage device is a metal alloy hydride storage tank.

18. A power device according to claim 14, wherein said energy source is a photovolatic array which converts solar energy to electrical power.

19. A power device according to claim 14 wherein said electrolysis-fuel cell comprises a solid polymer electrolyte cell.

\* \* \* \* \*

UNITED STATES PATENT AND TRADEMARK OFFICE
CERTIFICATE OF CORRECTION

PATENT NO. : 5,900,330
DATED : May 4, 1999
INVENTOR(S) : Kagitani

It is certified that error appears in the above-indentified patent and that said Letters Patent is hereby corrected as shown below:

Front Page, the Inventor's last name is incorrect. Please change "Kagatani" to --Kagitani--.

Signed and Sealed this

Nineteenth Day of October, 1999

Attest:

Q. TODD DICKINSON

*Attesting Officer*

*Acting Commissioner of Patents and Trademarks*

UNITED STATES PATENT AND TRADEMARK OFFICE
CERTIFICATE OF CORRECTION

PATENT NO.   : 5,900,330
DATED        : May 4, 1999
INVENTOR(S)  : Kagitani

It is certified that error appears in the above-identified patent and that said Letters Patent is hereby corrected as shown below:

<u>Title page, Item [54] and Column 1, line 1,</u>
Please change the title from "POWER DEVICE" to -- HYDROGEN, OXYGEN GENERATOR AND POWER DEVICE --

Signed and Sealed this

Twenty-ninth Day of April, 2003

JAMES E. ROGAN
*Director of the United States Patent and Trademark Office*